May 31, 1955 P. L. MATER 2,709,298
IMPLEMENT FOR SLICING
Filed March 19, 1953

INVENTOR.
PETER L. MATER
BY Charles R. Fay,
aty.

United States Patent Office 2,709,298
Patented May 31, 1955

2,709,298

IMPLEMENT FOR SLICING

Peter L. Mater, Leominster, Mass.

Application March 19, 1953, Serial No. 343,405

6 Claims. (Cl. 30—117)

This invention relates to a new and improved implement for slicing, particularly for restaurant or domestic use in the kitchen, and the principal object of the invention resides in the provision of a device of the class described which makes it much quicker, easier and cleaner to slice fruits and vegetables such as bananas, carrots, celery, cabbage, etc.

Another object of the invention resides in the provision of a generally U-shaped frame containing a series of spaced parallel cutting members which may be in the form of wires or sharpened blades, said U-shaped member being provided with a stop thereon for locating the fruit or vegetable to be cut, in combination with a second member provided with pusher fingers, said pusher fingers being spaced and parallel, and including means to move the frames to and from each other, said pusher fingers lying between the respective cutter members when the two frames are in close contacted position and expelling all of the cut slices completely from the cutters so that they drop into the receptacle provided for the sliced members.

In this connection it is to be observed that the cutter members act as a support for the articles to be cut and that the pusher fingers are adapted to be moved downwardly upon the same, so that the slices fall freely from the implement, and the article sliced is held in exact position relative to the cutter by means of the stop.

Other objects and advantages of the invention will appear hereinafter.

Reference is to be had to the accompanying drawings, in which.

Figure 1:
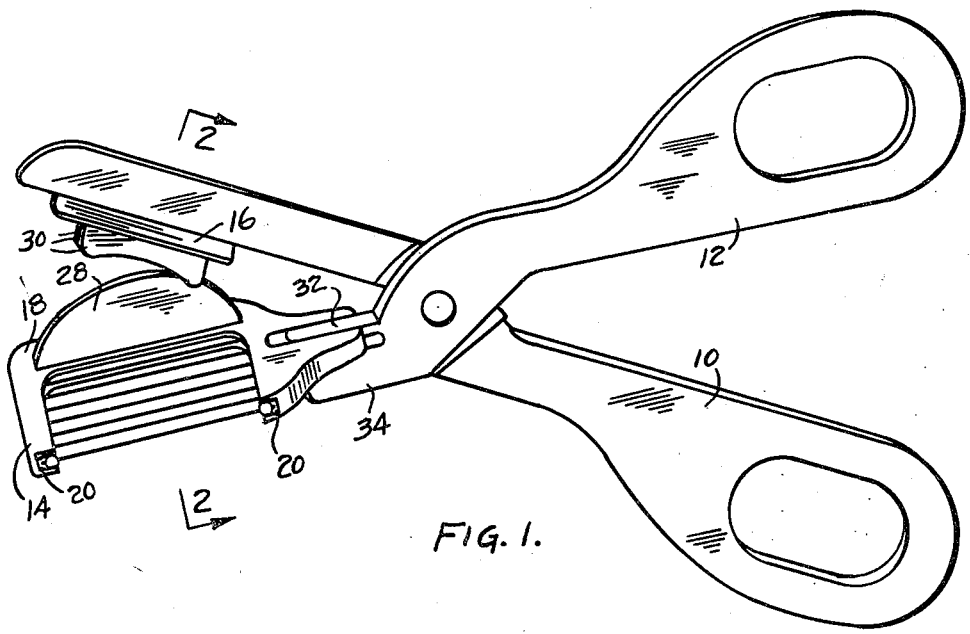
Fig. 1 is a perspective view illustrating a form of the invention.

Although the present invention may assume many different forms, it has been preferred to illustrate the same as of a scissors type including a scissor member 10 and a scissor member 12 which may be manipulated by the fingers of one hand in order to move a generally U-shaped frame 14 relative to a more solid frame 16.

The U-shaped frame 14 is provided with a closed end 18 and a pair of arms or legs, the latter having undercut tracks or the like 20 therein receiving another smaller U-shaped frame 22, so that frame 22 is receivable in and removable from frame 14.

Frame 22 contains the cutter members which may be wires 24 or these cutter members may take the form of blades 26 for heavier duty work, but in any event the remaining construction is substantially the same.

Figure 2:
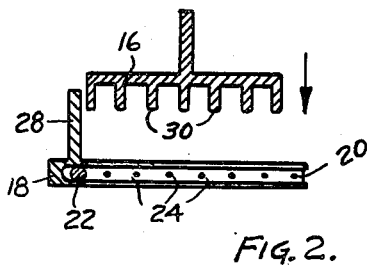
Fig. 2 is a section on line 2—2 of Fig. 1 but omitting the scissor implement details.

At the closed end 18 of the U-shaped member 14, there is provided an upstanding stop member 28 and the frame 16 is so arranged as to avoid this stop member in its downward motion relative to the frame 14 as clearly shown in Fig. 2.

Frame 16 is provided with a plurality of parallel spaced downwardly spaced pusher fingers 30, and when these fingers descend they push the article to be sliced, which is located by the stop member 28, down against and through the cutter members 24 or 26, and slicing the same and also expelling the slices completely from the device, so that it is not necessary to push the slices away or pick them up with the fingers.

Figure 3:
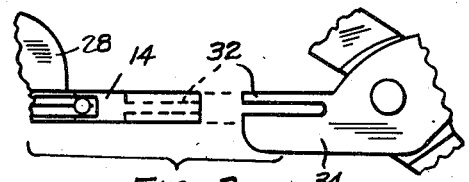
Fig. 3 is a combined view illustrating the removability of the cutter frame.
Figure 4:
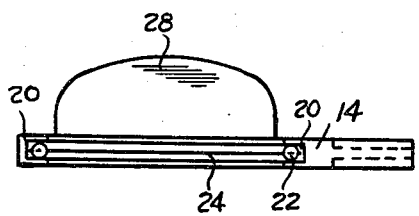
Fig. 4 is a view in front elevation of the cutter frame.
Figure 5:
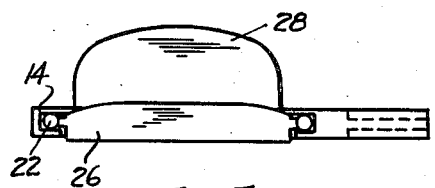
Fig. 5 is a view similar to Fig. 4 but illustrating a modified cutter arrangement.
Figure 6:
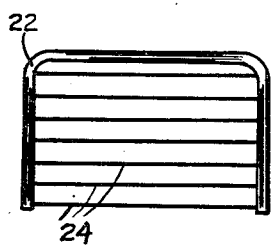
Fig. 6 is a top plan view of a cutter frame.

This implement will be seen to enable slicing and depositing of the slices very rapidly with the scissor members 10 and 12 held in the right hand and the article to be sliced held in the left hand. The article to be sliced is inserted between the frames 14 and 16 and butted against stop 28, whereupon the scissor members are manipulated to slice the article and dislodge and deposit the slices as explained above. The two frames illustrated herein may be substituted one for the other as will be clear, merely by withdrawing one frame 22 from the tracks 20 and inserting the other frame. However, it is also contemplated that the entire frame 14 may be made removable as by means of the tongue and grooved connection generally indicated at 32, see particularly Fig. 3 illustrating the removability of the frame 14 from the portion 34 of the pusher member 12.

Having thus described my invention and the advantages thereof, I do not wish to be limited to the details herein disclosed, otherwise than as set forth in the claims, but what I claim is:

1. An implement for slicing comprising an open frame, a series of spaced elongated generally parallel slicing members mounted therein, a second frame relatively movable with respect to the first frame, a stop on one frame extending therefrom parallel to the plane of the relative motion of the frames, said stop being located at one end of said one frame, the other frame being offset from the stop so that the two frames may come together, means to move the frames toward each other to slice an article therebetweeen and in contact with the stop, and a series of elongated independent pusher fingers on the other frame arranged to extend between the slicing members and dislodge the slices therefrom when the frames are close together.

2. An implement for slicing comprising an open frame, a series of spaced generally parallel slicing members mounted therein, a second frame above and relatively movable with respect to the first frame, a stop on the first frame rising therefrom parallel to the plane of the relative motion of the frames, said second frame being offset from the stop so that the two frames may come together, means to move the frames toward each other to slice an article therebetweeen and in contact with the stop, and a series of pusher fingers on the second frame arranged to extend between the slicing members and dislodge all slices therefrom, the article resting on the slicing members and the second frame being adapted to descend upon the first-named frame, allowing the slices to drop by gravity from the implement and avoiding the necessity of any action on the part of the operator to remove the slices.

3. An implement for slicing comprising an open frame, a series of spaced generally parallel slicing members mounted therein, a second frame relatively movable with respect to the first frame, a stop on the first frame rising therefrom parallel to the plane of the relative motion of the frames, said second frame being offset from the stop so that the two frames may come together, means to move the frames toward each other to slice an article therebetween and in contact with the stop, and a series of pusher fingers on the second frame arranged to extend between the slicing members and dislodge all slices therefrom, the article resting on the slicing members and the second frame being adapted to descend upon the first-named frame, said slicing members consisting of narrow wires.

4. An implement for slicing comprising an open frame, a series of spaced generally parallel slicing members mounted therein, a second frame relatively movable with respect to the first frame, a stop on the first frame rising therefrom parallel to the plane of the relative motion of the frames, said second frame being offset from the stop so that the two frames may come together, means to move the frames toward each other to slice an article therebetween and in contact with the stop, and a series of pusher fingers on the second frame arranged to extend between the slicing members and dislodge all slices therefrom, said slicing members consisting of sharp parallel blades.

5. A slicing implement comprising a U shaped frame, tracks at the inside surfaces of the legs of the U, a removable U-shaped cutter frame slidable in said tracks, a stop member rising from the closed end of the U and being parallel thereto, a pusher frame adapted to descend to contact with the first-named frame, spaced parallel pusher fingers on the pusher frame, means to move the pusher frame to and from the first-named frame, and spaced parallel cutters on the removable cutter frame for cooperation with the pusher fingers.

6. The implement of claim 5 wherein said means comprises a scissors and including means to detachably hold the first-named frame on one scissor member, the pusher frame being mounted on the cooperating scissor member.

References Cited in the file of this patent

UNITED STATES PATENTS

| | | |
|---|---|---|
| 573,099 | Mikami | Dec. 15, 1896 |
| 767,386 | Canclini | Aug. 16, 1904 |
| 1,962,737 | Gutmann | June 12, 1934 |
| 2,563,237 | Grocoff | Aug. 7, 1951 |